US008671584B2

(12) United States Patent
Meisman

(10) Patent No.: US 8,671,584 B2
(45) Date of Patent: Mar. 18, 2014

(54) DRILL POSITIONER FOR A COORDINATE MEASURING MACHINE

(76) Inventor: Stephen Anthony Meisman, Zephyrhills, FL (US)

( * ) Notice: Subject to any disclaimer, the term of this patent is extended or adjusted under 35 U.S.C. 154(b) by 361 days.

(21) Appl. No.: 13/183,044

(22) Filed: Jul. 14, 2011

(65) Prior Publication Data

US 2012/0180590 A1 Jul. 19, 2012

Related U.S. Application Data

(60) Provisional application No. 61/364,349, filed on Jul. 14, 2010.

(51) Int. Cl.
*G01B 5/25* (2006.01)

(52) U.S. Cl.
USPC ............................. 33/645; 33/638; 74/479.01

(58) Field of Classification Search
USPC ..................... 33/613, 645, 638, 642, DIG. 21
See application file for complete search history.

(56) References Cited

U.S. PATENT DOCUMENTS

| | | | | |
|---|---|---|---|---|
| 3,310,876 | A * | 3/1967 | Yamron | 33/268 |
| 4,270,387 | A * | 6/1981 | Hoffman | 33/318 |
| 5,017,056 | A | 5/1991 | Morash | |
| 5,402,582 | A | 4/1995 | Raab | |
| 5,611,147 | A | 3/1997 | Raab | |
| 5,956,857 | A | 9/1999 | Raab | |
| 6,855,099 | B2 | 2/2005 | Hazlehurst et al. | |
| 7,549,827 | B2 | 6/2009 | Siegfried | |
| 8,099,876 | B1 * | 1/2012 | Truncale et al. | 33/324 |
| 2002/0050067 | A1 * | 5/2002 | Duska et al. | 33/286 |
| 2010/0101341 | A1 * | 4/2010 | Bunch et al. | 74/5.37 |
| 2010/0162580 | A1 * | 7/2010 | Mauro | 33/1 N |
| 2010/0218392 | A1 * | 9/2010 | Lai | 33/391 |

* cited by examiner

*Primary Examiner* — G. Bradley Bennett
(74) *Attorney, Agent, or Firm* — Ronald L. Hofer

(57) ABSTRACT

A fixture for positioning a drill, vector or the like, has a gimbal mechanism with a tubular bushing extending therethrough. The gimbal mechanism is angularly adjustable and is held by a mounting assembly which is horizontally adjustable along an x-axis and y-axis. In a preferred embodiment of the present invention, the mounting assembly is supported on a base which carries an x-axis mechanism for adjusting the location of the ball member along an x-axis and a y-axis mechanism for adjusting the location of the ball along a y-axis.

17 Claims, 4 Drawing Sheets

DRILL POSITIONER FOR A COORDINATE MEASURING MACHINE

BACKGROUND OF THE INVENTION

The present invention relates to adjustable tool guides. More particularly, the present invention relates to adjustable drill guides for use with coordinate measuring machines.

Modern precision manufacturing systems often use coordinate measuring machines which are capable of accurately locating points in space and storing their relative locations in three axis coordinates. The set of locations provide basis for subsequent computer manipulation for design, manufacturing and other purposes. Such machines have substantially increased the accuracy of modern-day manufacturing systems. During the manufacture of aircraft and other precision manufacture products, it is often necessary to accurately locate and drill holes for bolts, pins, rivets and the like. Coordinate measuring machines can locate points in space, however, accurate drilling requires both accurate location of the center of a hole to be drilled as well as accurate positioning of the trajectory of the drill when boring the hole. Generally speaking, it remains laborious to accurately line up a drill for a hole and there remains a need for an improved fixture or device which can be readily placed in a proximate position and then adjusted to accurately locate a hole, and in particular to accurately locate a "true position hole" using a coordinate measuring machine.

In accordance with the present invention, an adjustable drill positioner is provided, which can be used in conjunction with the probe of a coordinate measuring machine or CNC machine to accurately position a hole such as a "true position hole" as is often required, in a modern precision manufacturing process. In addition the positioner of the present invention is also subject to other uses to position devices other than drills and is adaptable for manual use without a coordinate measuring machine or a CNC machine.

Further understanding of the present invention will be had from the following description and claims taken in conjunction with the accompanying drawings.

SUMMARY OF THE INVENTION

A fixture for positioning a drill, vector, laser pointer or the like, comprises a gimbal mechanism which is angularly adjustable and which has a tubular guide bushing extending therethrough. The gimbal mechanism is held by a mounting assembly which is horizontally adjustable along an x-axis and y-axis. In a preferred embodiment of the present invention, the mounting assembly is supported on a base which carries an x-axis mechanism for adjusting the location of the ball member along an x-axis and a y-axis mechanism for adjusting the location of the ball along a y-axis.

DESCRIPTION OF THE INVENTION

Figure 1:
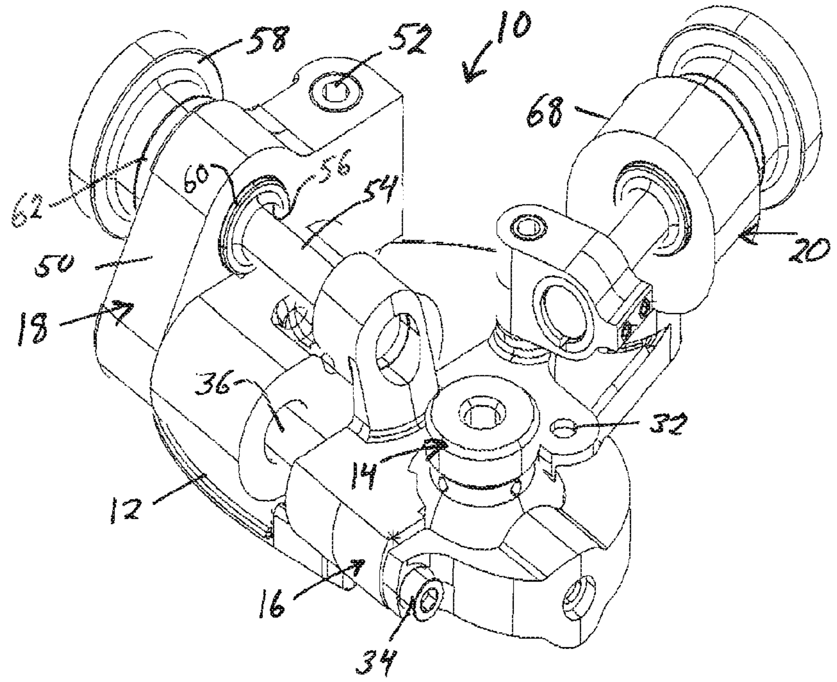
FIG. 1 is a perspective view of a preferred embodiment of a drill positioner of the present invention.
Figure 2:
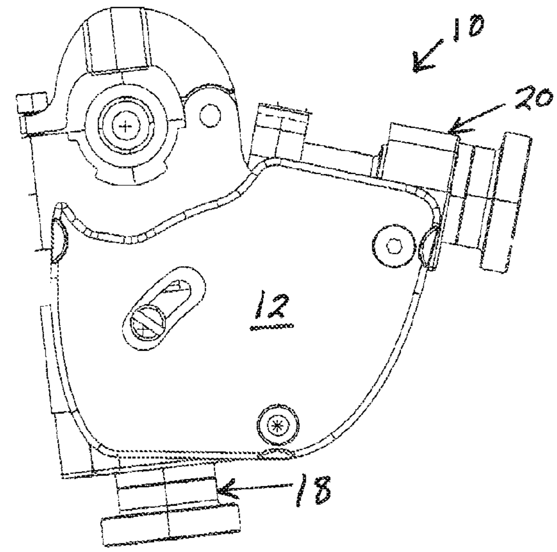
FIG. 2 is a bottom plan view of the drill positioner of FIG. 1.
Figure 3:
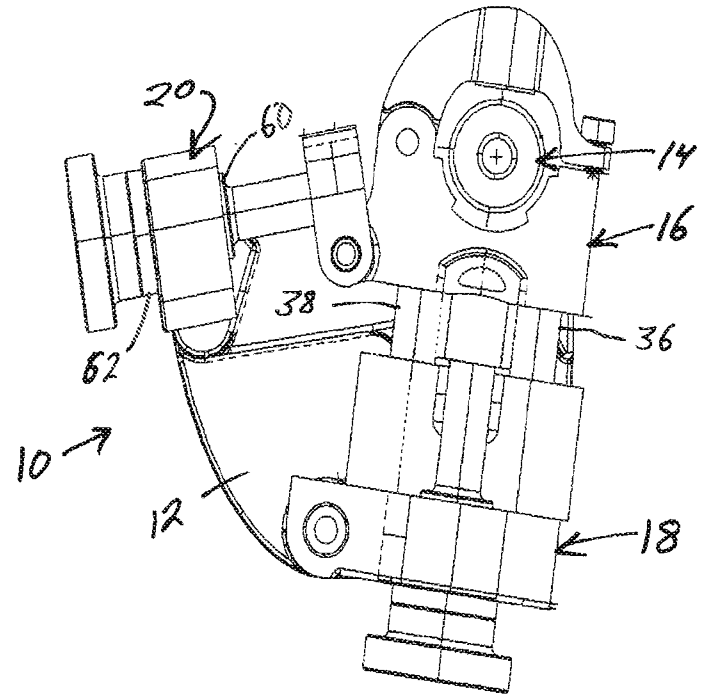
FIG. 3 is a top plan view of the drill positioner of FIG. 1.
Figure 4:
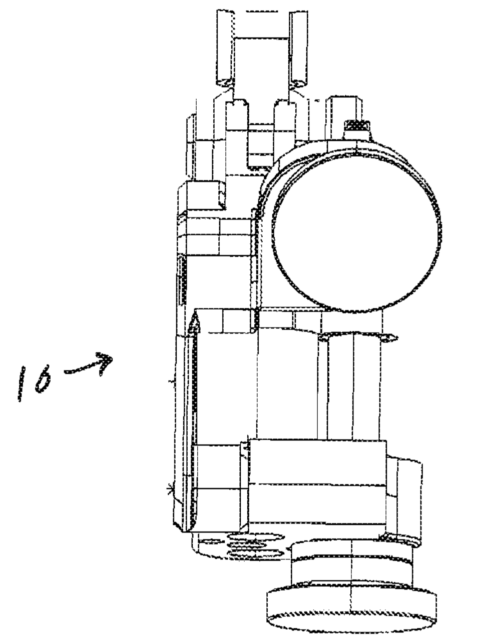
FIG. 4 is an end elevational view of the drill positioner of FIG. 1.
Figure 5:
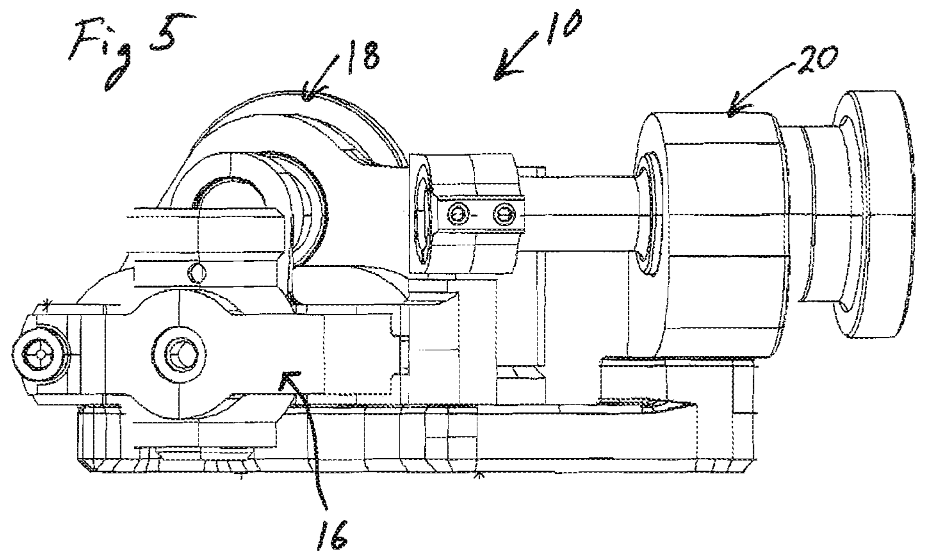
FIG. 5 is a side elevational view of the drill positioner of FIG. 1.
Figure 6:
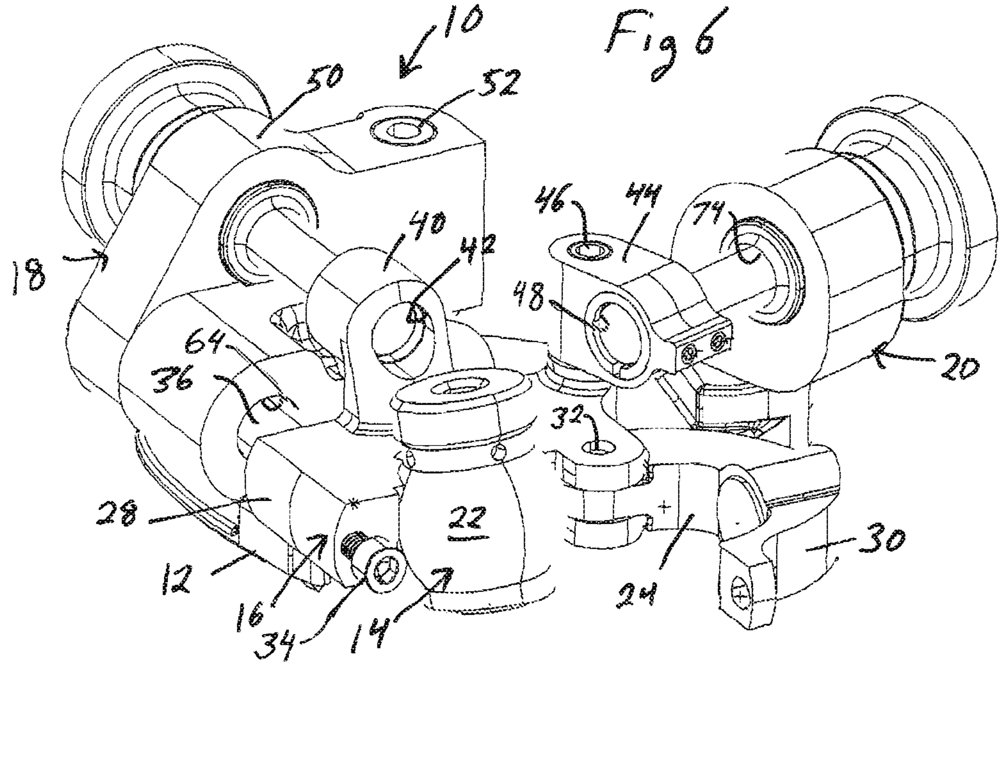
FIG. 6 is a perspective view of the drill positioner of FIG. 1 with the bail in an open condition and illustrating a tilted ball member.
Figure 7:
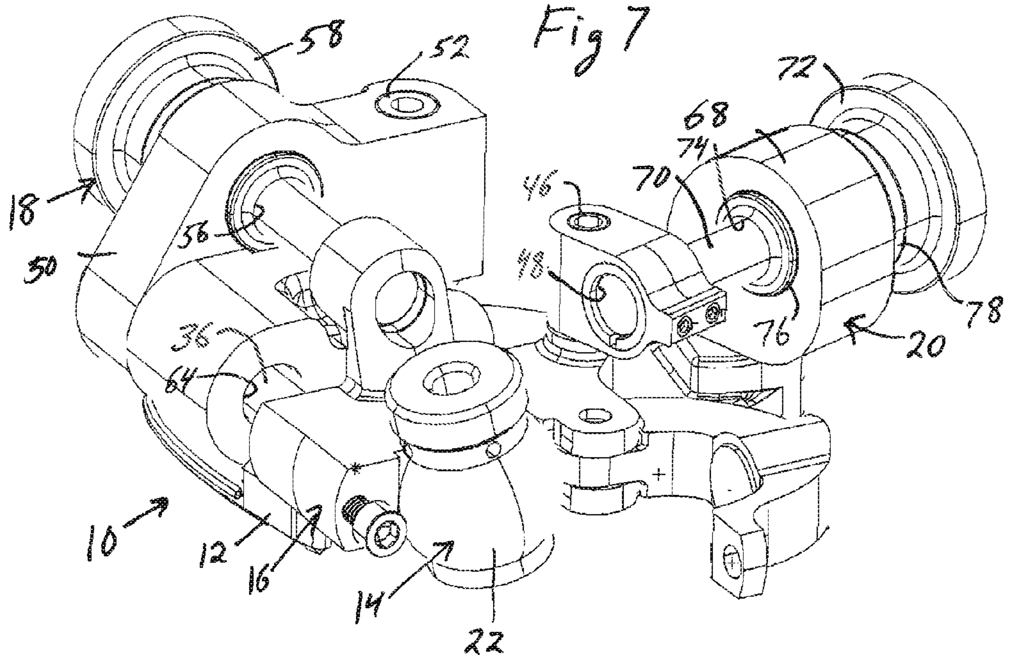
FIG. 7 is a view similar to FIG. 6 but showing the ball member in a different tilted position.
Figure 8:
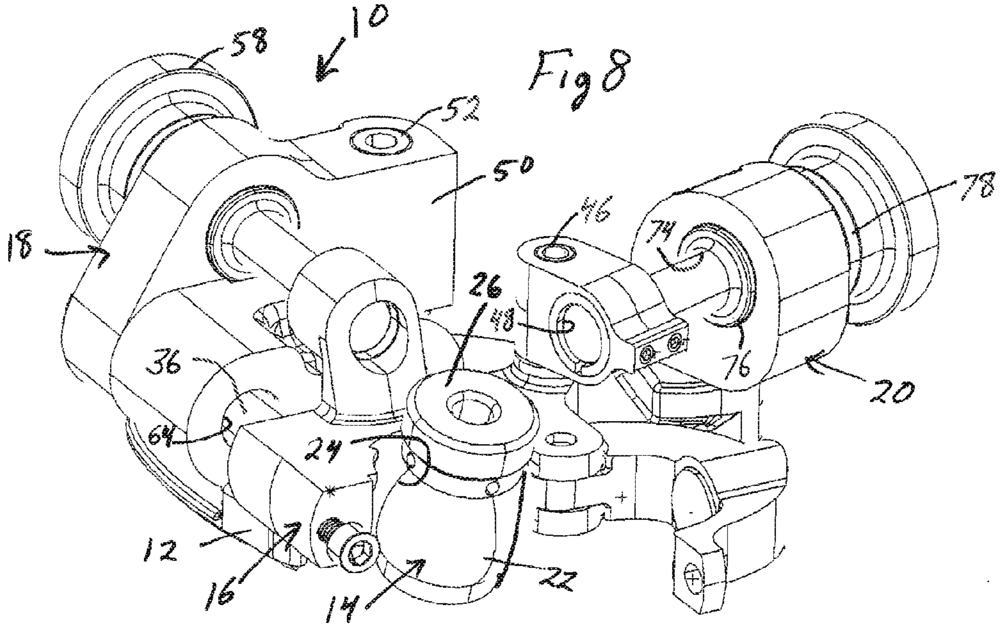
FIG. 8 is a view similar to FIGS. 6 and 7 but showing the ball member in a different tilted position.

Now referring to the Figures, a preferred embodiment of a drill positioner of the present invention is shown and indicated generally by the numeral 10. Generally speaking drill positioner 10 has base 12, gimbal mechanism 14, floating mount assembly 16, "x-axis" adjust mechanism 18, and "y-axis" adjust mechanism 20.

Gimbal mechanism 14 comprises a generally spherical ball member 22 rotatably carried in correspondingly shaped cavity 24 in floating mount assembly 16. A cylindrical bore 24 extends through gimbal mechanism 14. Tubular drill bushing 26 fits tightly but removably in bore 24. Of course, drill bushing 26 is selected to have the desired inner diameter for use with a specific sized drill. Ball member 22 has an upper extension 24 to provide additional support for drill bushing 26 and additional length for increased accuracy when drill positioner 10 is used as set forth in more detail below.

Floating mount assembly 16 has floating mount 28 and bail 30 which is selectively pivotally secured thereto by pivot pin 32 and bolt 34. Loosening of bolt 34 from its securement in correspondingly threaded bore in floating mount 28 allows ball member 22 to be readily pivoted into desired angular position for the bore of drill hushing 26. Removal of bolt 34 from floating mount 28 allows bail 30 to be pivoted away from floating mount 28 and the removal of ball member 22.

Floating mount 28 has a pair of parallel smooth rods 36 and 38 fixedly secured thereto and has an upwardly and outwardly extending elbow 40 with a threaded bore 42. Rods 36 and 38 and threaded bore 42 extend generally in the direction of the "x-axis" and allow adjustment of the "x-axis" position of floating mount assembly 16 with respect to base 12 as. Floating mount 28 also has collar 44 pivotally attached thereto by pin 46 which is press fit into floating mount 28. Although not shown in the figures, the top of pin 46 can be internally threaded to receive a bolt and washer to hold down collar 44. Collar 44 has a threaded bore 48 therein which extends along the "y-axis" to allow adjustment of the position of floating mount assembly 16 with respect to the "y-axis."

"X-axis" adjust mechanism comprises "x-axis" pivot housing 50 which is secured to base 12 by pin 52 press fit into a hole (not shown) in base 12. Although not shown in the figures, the top of pin 52 can be internally threaded to receive a bolt and washer to hold down pivot housing 50. The term "x-axis" refers to the axis parallel to adjust rod 54 and rods 36 and 38. Pin 52 allows pivotal movement of housing 50 with respect to base 12 although such pivotal movement is restricted by the "y-axis" adjust mechanism. "X-axis" adjust rod 54 extends through bore 56 in pivot housing 50. "X-axis" adjustment knob 58 is secured to rod 54 which cannot move axially within bore 56 as such axial movements are prevented by shoulder 60 on adjust rod 54 and bushing 62 between knob 58 and housing 50. The forward end of rod 54 is threaded and extends into bore 42 of floating mount 28. Hence, rotation of knob 58 moves floating mount assembly 16 along the "x-axis." Smooth rods 36 and 38 of floating mount assembly 16 are slidably carried, in bores 64 and 66 respectively in pivot housing 50 and support floating mount assembly 16 with respect to base 12 while allowing movement along the "x-axis" with respect thereto. It will be appreciated by those skilled in the art that in the preferred embodiment of the present invention, movement of the "x-axis" adjustment mechanism and "y-axis" adjustment mechanism involves slight skewing of the direction of the x-axis and y-axis before the adjustment due to the pivotal movement of the respective mechanisms about pins 52 and 46.

"Y-axis" adjust mechanism comprises "y-axis pivot housing 68, "y-axis" adjust rod 70 and "y-axis" adjust knob 72. The term "y-axis" refers to the axis parallel to rod 70. Rod 70 has a threaded end extending into threaded bore 48 of collar 44 and a knob 72 which is secured at its opposite end. Rod 70 extends through bore 74 in pivot housing 68 and is manually rotatable therein but not axially moveable, being constrained by shoulder 76 on rod 70 and bushing 78 between knob 72 and pivot housing 68.

Further understanding of the present invention will be had from the following description of its operation, its method of use being a part of the present invention.

In a preferred embodiment of the present invention drill positioner 10 is used in conjunction or association with a coordinate measuring machine. Such machines are now well known in the art and are disclosed in several patents such as U.S. Pat. No. 5,402,582 Apr. 4, 1995 to Simon Raab for THREE DIMENSIONAL COORDINATE MEASURING APPARATUS and U.S. Pat. No. 5,611,147 Mar. 18, 1997 to Simon Raab for THREE DIMENSIONAL COORDINATE MEASURING APPARATUS. Suitable coordinate measuring machines are commercially available from Faro Technologies Inc. of Lake Mary Fla., US.

In use, base 12 of drill positioner 10 is positioned and temporarily secured to a substrate to be drilled such that drill bushing 26 is proximate to its desired precise position on the substrate. Base 12 can be temporarily secured to the substrate by clamps, hot glue or two sided tape or any other adhesive which will temporarily secure base 12 in position on the substrate but will allow the removal of base 12 without damage to the substrate's surface. Location of drill positioner 10 is preferably done by inserting the probe of an associated coordinate measuring apparatus into the center of ball member 22 within drill bushing 26 within and using the probe to locate the center of the bore of bushing 26 on the desired trajectory line to be drilled. Then the probe of a coordinate measuring machine is moved upwardly higher within bushing 26 and used to locate the center of the bore of bushing 26 at a higher point on the desired trajectory line to be drilled. It will be appreciated by those skilled in the art that ball member 22 will be rotated to properly position the center of the bore of drill bushing 26 to fix the proper trajectory but that such rotation will not move the first point located within the center of ball member 22 which point will remain along the desired trajectory line. Then bolt 34 and pin 32 can be tightened and drill bushing 26 used to guide a drill into the substrate at the precise desired location and along the precise desired trajectory. After its use, drill positioner 10 can then be removed from the substrate. Of course, drill bushing 26 may carry and guide a drill but is also well suited to carry and aim a vector or a laser emitting device such as a laser pointer.

Base 12 of drill positioner 10 supports gimbal mechanism 14, "x-axis" adjust mechanism 18, and "y-axis" adjust mechanism 20. It will be appreciated by those skilled in the art that to precisely drill or otherwise bore a hole into a substrate the drill must be positioned "horizontally" with respect to an "x" axis and a "y" axis perpendicular thereto and that the trajectory line of the drill must be correctly aligned. These adjustments can be readily made by use of the aforementioned mechanisms.

It will be appreciated by those skilled in the art that the above-described preferred embodiment of the present invention is subject to variation and modification. Such variations and modifications are considered to be within the broad scope of the present invention which is intended to be limited only by the following claims.

What is claimed is:

1. A fixture for positioning a drill, vector, laser or the like, comprising a gimbal mechanism with a tubular bushing extending therethrough and a mounting assembly holding said gimbal mechanism with respect to a substrate, said mounting assembly being horizontally adjustable along an x-axis and y-axis and allowing selective movement of said gimbal mechanism along said x-axis and said y-axis.

2. A fixture as in claim 1, said fixture having an x-axis adjustment mechanism and a y-axis adjustment mechanism.

3. A fixture as in claim 2, wherein each said x-axis adjustment mechanism and said y-axis adjustment mechanism have a housing secured to a base.

4. A fixture as in claim 3 wherein said gimbal mechanism comprises a bail member rotatably carried in a correspondingly shaped cavity in said mounting assembly.

5. A fixture as in claim 4 wherein said mounting assembly is supported on a base.

6. A fixture as in claim 5 wherein each of said x-axis and y-axis mechanisms are pivotally supported on said base.

7. A fixture as in claim 1 wherein said gimbal assembly has a floating mount and a bail which is selectively pivotally attached to said floating mount.

8. A fixture as in claim 3 wherein said floating mount has a pair of parallel rods fixedly secured thereto, said rods being slideably positioned in a housing.

9. A fixture comprising a gimbal mechanism with a tubular bushing extending therethrough and a mounting assembly holding said gimbal mechanism with respect to a substrate, said mounting assembly being horizontally adjustable along an x-axis and y-axis and allowing selective movement of said gimbal mechanism along said x-axis and said y-axis, said tubular bushing carrying a drill.

10. A fixture as in claim 1, said fixture having an x-axis adjustment mechanism and a y-axis adjustment mechanism.

11. A fixture as in claim 2, wherein each said x-axis adjustment mechanism and said y-axis adjustment mechanism have a housing secured to a base.

12. A fixture as in claim 3 wherein said gimbal mechanism comprises a ball member rotatably carried in a correspondingly shaped cavity in said mounting assembly.

13. A fixture as in claim 4 wherein said mounting assembly is supported on a base.

14. A fixture as in claim 5 wherein each of said x-axis and y-axis mechanisms are pivotally supported on said base.

15. A fixture as in claim 1 wherein said gimbal assembly has a floating mount and a bail which is selectively pivotally attached to said floating mount.

16. A fixture as in claim 3 wherein said floating mount has a pair of parallel rods fixedly secured thereto, said rods being slideably positioned in a housing.

17. A fixture comprising a gimbal mechanism with a tubular bushing extending therethrough and a mounting assembly holding said gimbal mechanism with respect to a substrate, said mounting assembly being horizontally adjustable along an x-axis and y-axis and allowing selective movement of said gimbal mechanism along said x-axis and said y-axis, said tubular bushing carrying a laser pointer.

* * * * *